Feb. 5, 1929.

J. A. BORLAND

PISTON

Filed Nov. 21, 1925     4 Sheets-Sheet 1

1,701,355

Inventor
John A. Borland

Inventor
John A. Borland

Feb. 5, 1929.
J. A. BORLAND
1,701,355
PISTON
Filed Nov. 21, 1925     4 Sheets-Sheet 3
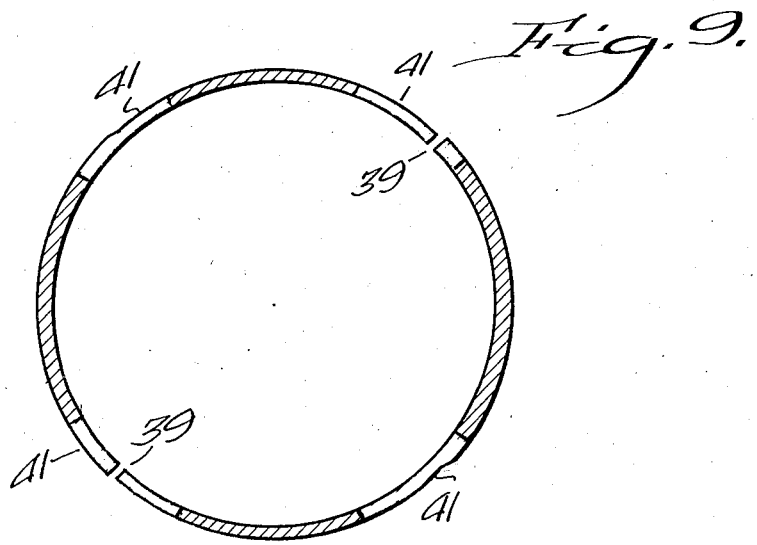
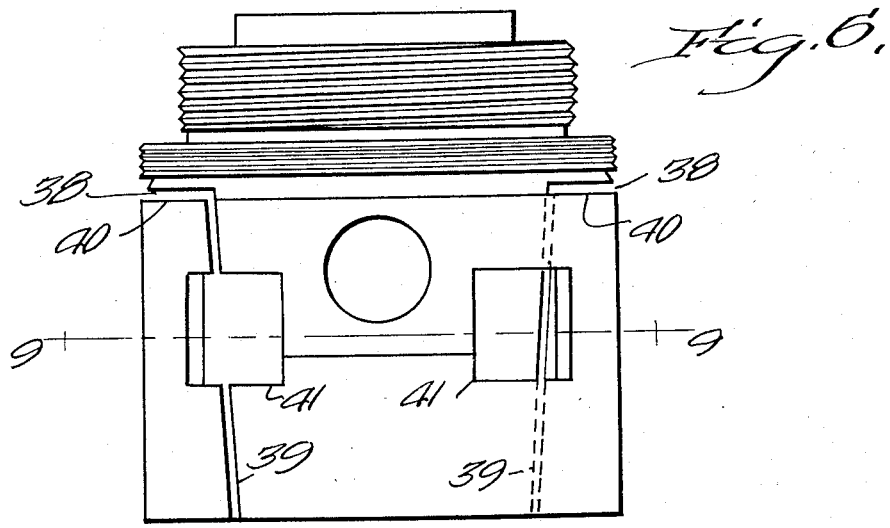
Inventor
John A. Borland Feb. 5, 1929.

J. A. BORLAND 1,701,355

PISTON

Filed Nov. 21, 1925

Inventor
John A Borland

Patented Feb. 5, 1929.

1,701,355

UNITED STATES PATENT OFFICE.

JOHN A. BORLAND, OF ST. PAUL, MINNESOTA.

PISTON.

Application filed November 21, 1925. Serial No. 70,683.

This invention relates to pistons and particularly to a piston packing and skirt.

This invention is a continuation in part of my co-pending application, Serial Number 15,550, filed March 14, 1925, it being intended to elect in pursuing this application to pursue the subject matter disclosed therein in relation to the piston packing and skirt and embody herein certain improvements thereover.

An object of this invention is to provide an improved means of mounting the packing rings on a piston head. It is very difficult with standard pistons to disassemble the packing rings from the piston head upon their becoming worn or otherwise disabled and it necessitates the removable of the piston from the head, necessitating also disassembling of the connecting rod and other parts retaining the piston in the cylinder.

It is an object of this invention to provide means of mounting the packing rings so that the shoulder which supports them may be removed and thereby avoid the necessity of removing the whole piston from its connections. In the conventional construction of a motor, the cylinder head is removable, thereby opening up a series of cylinders and with my improved device, the pistons are sufficiently exposed so that with the spanner wrench, all the packing rings may be taken out and replaced and this may be done in a very small fraction of the time required heretofore in the art. Not only is it an object of this improved construction to enable the quick change of the packing rings, but it is a further object of this invention to provide a means for holding the packing rings in tight relation longitudinally relative to the piston so as to prevent the escapement of gases and air under compression and also the leakage of oil which in the conventional type of piston is not accomplished by reason of the necessary looseness of the packing rings in the grooves cut therefor, especially if the packing rings or grooves, or both have become worn.

It is a further object of this invention to provide a yielding means for retaining these rings in such a tight relation, which yielding means is not subject to the difficulties heretofore encountered of forcing itself against the cylinder wall.

A further object of this invention is to provide an oil release for the packing rings and to prevent the passage of the oil through the packing rings or into the combustion chamber.

It is a further object of this invention to provide spacer rings between the packing rings and to provide a packing ring arrangement susceptible of utilizing standard packing rings of different sizes.

It is a further object of this invention to provide against lost compression.

A still further object of this invention is to provide against piston slap and eliminate carbon deposits.

With the foregoing and other objects in view, I have invented the device shown in the accompanying drawings, in which, Figure 1 is a perspective view of my improved piston assembled.

Figure 6 is a side elevation of the modified form of the piston head.

Figure 9 is a section 9—9 of Figure 6.

Like reference characters indicate like parts throughout the several views and in the specification.

Figure 1:
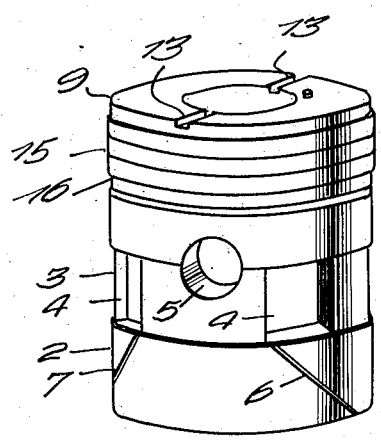
Figure 2:
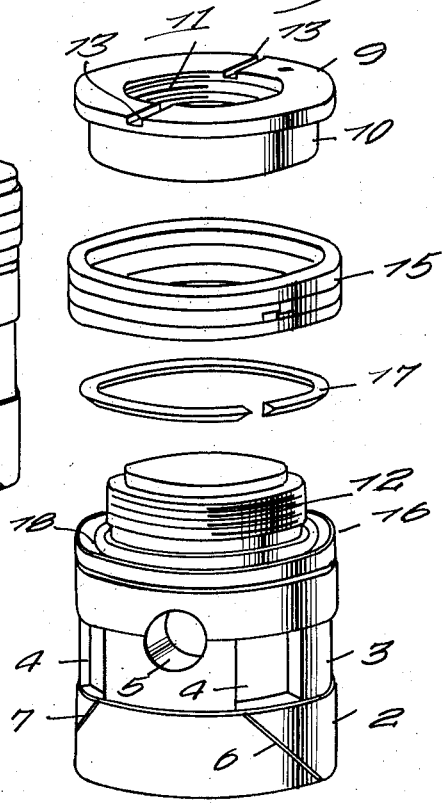
Figure 2 is a similar perspective with the parts disassembled.
Figure 3:
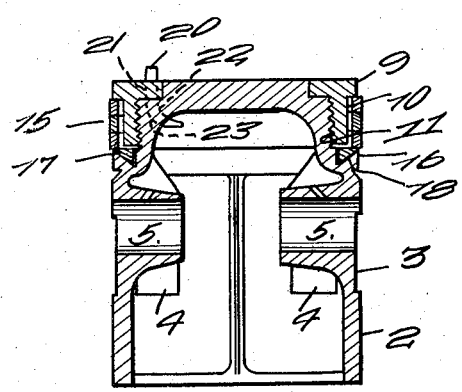
Figure 3 is a longitudinal section through the piston.
Figure 5:
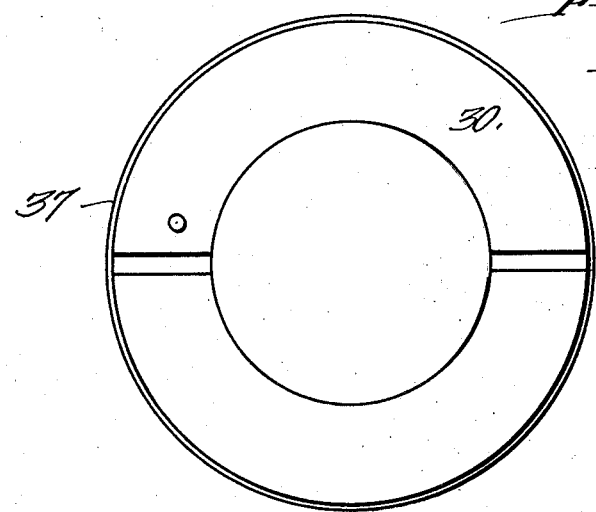
Figure 5 is a top plan view of the showing in Figure 4.

In the embodiment of my invention, I provide a piston similar in construction to the conventional type, the body portion of which is designated by the numeral 2 and in the center portion I provide a reduced channel 3 provided with boxes 4 and the usual wrist point bearing 5 and I provide therein diagonally disposed oil grooves 6 and 7, one of these oil grooves being disposed preferably at an opposite angle of inclination to that of the other. These oil grooves lead from the box 4. On the upper end of the piston or, in other words, upon the end of the piston, which is in the explosion chamber, I provide a gland packing shoulder in the form of a ferrule, which gland or shoulder carries a flange 9 and a reduced or annular surface 10, the reduced or annular surface adapted to carry the packing rings and substantially fitting within the standard packing rings, but being of slightly lesser length than the full set of rings. This ferrule is internally screw threaded at 11 and the piston head is likewise externally screw threaded at 12 in a reduced portion of its length. The threads at 11 co-mate with the threads at 12, whereby the gland 9 may be screwed onto and off of the piston by the insertion of a spanner wrench in slots 13 upon the packing gland. The packing rings designated as 15 are in assembling, mounted upon the annular portion 10 of the gland and between these rings 15 and a shoulder 16 upon the piston, I mount a yielding ring 17, the ring 17 being of resilient material and of triangular cross section with the apex of the triangle at the periphery of the ring and adapted to fit within a like-shaped groove 18, the groove 18 carried in the shoulder 16 of the piston. Consequently, longitudinal pressure or pressure by reason of forcing of the rings against the member 17, will cause the member 17 to compress or be of reduced diameter and by reason of its resilient nature will cause it to act as a spring, yieldingly forcing the rings 15 together and against the flange or shoulder 9, thereby providing a tight packing arrangement. If, for instance, the apex of the triangle were reversed, then it is obvious that this pressure would cause the ring 17 to expand and to become of greater rather than reduced diameter and would result in its pressing against the cylinder wall, thereby causing wear, friction and other difficulties.

In assembling my device the ring 17 is first dropped into this channel 18 and then the rings 15 together with the gland 8 are mounted upon the head and the gland 8 screwed into position against a predetermined resistance of the spring 17 and then a pin 20 is driven into a pair of registering holes 21 and 22, the latter 22 being provided with an angular surface 23 whereby the pin 21 is bent inwardly upon being driven against said surface and thereby locked against withdrawal, except by force, the pin 21 being of a special alloy adapted not only to stand this bending operation in the best manner, but also adapted to withstand heat without throwing off a spark to cause premature explosion. A steel pin or screw would cause a premature explosion and could not be used. A screw in any alloy would be impracticable for it would work out.

This taper pin which bends itself automatically when driven in, is the only practical lock for this purpose. In assembling, I allow this pin 20 to project beyond the head of the cylinder for about three-sixteenths of an inch so as to grip it with a bar or pliers and quickly remove the same. It will be seen that in thus assembling, all that is necessary is to remove this pin and unscrew the gland and the entire set of rings can be easily and quickly removed, nor need they be stretched over the shoulder, nor need the piston be brought to the surface of the cylinder. It will further be noted that this is not a new piston head structure with the necessarily added weight, but that it is a very light ferrule which adds substantially no weight to the conventional piston.

It will be further noted that not only does this structure enable the quick and easy change of worn or otherwise disabled parts, but also that it prevents the escapement of gas and thereby adds to the thermal efficiency of the engine and likewise on the compression stroke, prevents the escapement of air and furthermore prevents the oil from getting into the explosion chamber and cause carbon trouble, and in addition to overcoming the difficulties of cylinder heating and the other advantages herein suggested, it will be obvious that it makes this structure a distinct advance in the art. While I have disclosed certain elements, features and advantages, it is understood that reservation is made and that my invention is not limited thereto.

Figure 4:
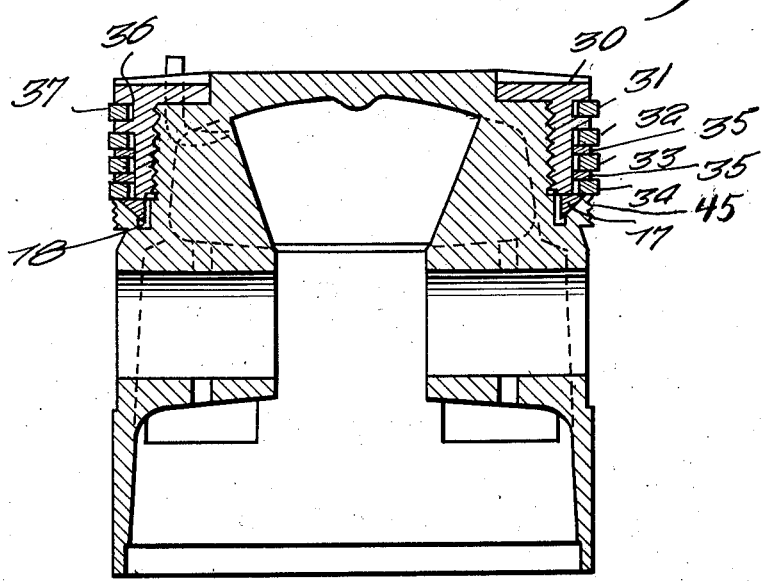
Figure 4 is a longitudinal section through a modified form.
Figure 7:
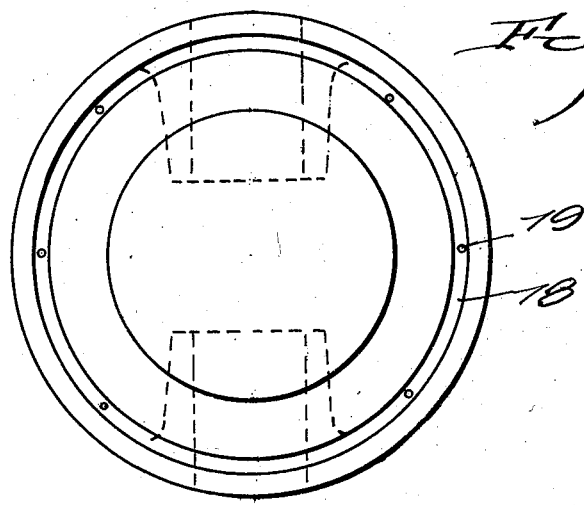
Figure 7 is a top plan view of the showing in Figure 6.
Figure 8:
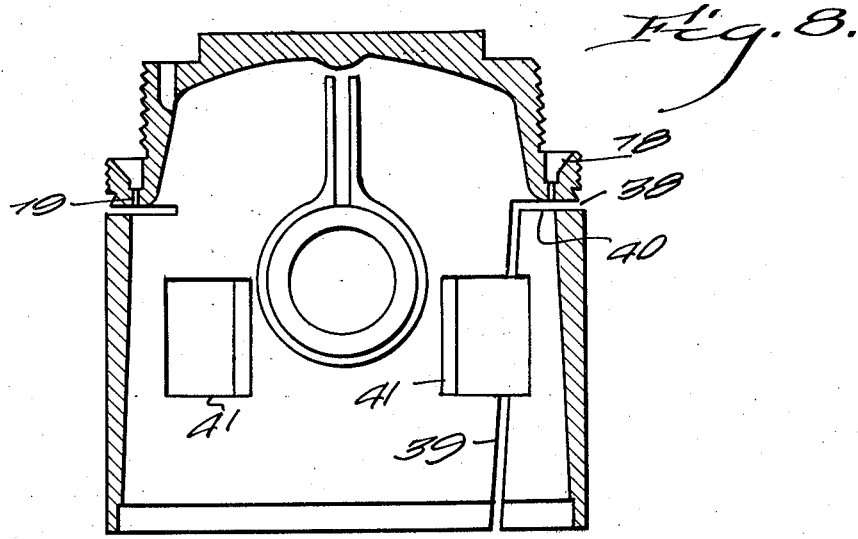
Figure 8 is longitudinally a section of Figure 7.

In the modification shown in Figure 4 I provide a packing gland 30 carrying rings 31, 32, 33 and 34 yieldingly held in position by the ring 17. Between the rings 32, 33 and 34, the spacing washers 35 fit over the external surface of the gland 30 and may be of any desired thickness. The washers 35 come off of the rings when they are disassembled. They are not cut like the packing rings but fit over the glands with a slide fit, one between each ring as a spacer and are controlled automatically with the packing rings by the compensating ring 17. I further provide upon the gland 30 a channel 36 adapted to receive a snap ring 37. The ring 37 is not controlled by the ring 17 but works in an independent groove and is a scavenger or sweep ring. This scavenger ring sweeps the foul gases and soot from low grade gasoline and also takes the blunt of the explosion in the combustion chamber and also keeps a large percentage of the intense heat away from the automatic compression group which automatic compression group is mounted lower on the piston and further away from the high heat units. This arrangement permits the automatic group to last the life of any car. The scavenger ring 37 comes out with the gland and can be replaced the same as the high compression group without tearing down the motor or disturbing any bearings.

The skirt in the modified form is provided with preferably two kerfs or slits 38 which slits extend at a slight angle as at 39 the entire length of the skirt and also as at 40 for a portion of the distance around the skirt thereby providing together with the openings 41, a resilient skirt making the piston flexible and permitting a perfect fit in the motor.

When the gland 30 is screwed down securely until it seats within, the rings 32, 33 and 34 are pressed against the ring 17 which causes the ring 17 to deliver an upper pressure at all times and keeps the rings tight and does not allow the rings to wear in the grooves or any oil to pass around them. At the base of the grooves 18 I provide or drill through the shell; a plurality of holes 19, there being preferably eight of these holes which are delivered from the bottom of the groove 18 so that if any oil should collect in this groove, it readily drops back into the groove 18 and readily drops back into the case where it belongs.

The arrangement of the modification permits the use of standard rings and by using different width spacers, it permits the use of different width rings. For example, as shown in the drawings, there would be three one-eighth inch rings and two one-sixteenth inch spacers in the automatic groove which is just a one-half inch groove. On the other hand for example, we could use two three-sixteenths inch rings and one one-eighth inch spacer which would give the same one-half inch groove or we could use two one-fourth inch rings without a spacer and a washer and the compensating ring 17 would have all under control. However, the spacer washers are preferable and give higher efficiency.

Below the ring 34 and just above the slit 38; that is to say, between the ring 34 and the slit 38, are carried parallel oil grooves 45. The piston is flexible up to the grooves 45, owing to the way the skirt is slit, and between the milled slits and the ring group, which is about three-eighths of an inch wide, these parallel grooves are cut. These grooves are quite shallow, but of sufficient depth to carry a little film of oil, and also they permit the piston to be fitted in snugly, and when the piston becomes hot and expands, the parallel grooves wear off and fit the cylinders perfectly; according to the driver, some drivers requiring more clearance than others. Thus, the grooves make the piston "fool proof" and provide a perfect fit from rings to bottom of skirt.

Having described my invention, what I claim and what I desire to secure by Letters Patent is:—

1. In combination with a piston head provided with a skirt, a compression ring, a ledge like channel for receiving the compression ring, the compression ring channel provided with a V-shaped bottom pointing toward the skirt and a plurality of oil openings leading from the bottom of the channel to internal of the skirt.

2. In combination with a piston head provided with a skirt, a compression ring, a ledge-like channel for receiving the compression ring, the compression ring channel provided with a V-shaped bottom pointing toward the skirt a plurality of oil openings leading from the bottom of the channel to internal of the skirt, and a removable gland carried by the piston for compressing said ring.

3. The combination set forth in claim 2, and a plurality of packing rings carried by said gland.

4. The combination set forth in claim 2, and a plurality of packing rings carried by said gland, the lower one of which seats upon said first ring.

In testimony whereof I affix my signature.

JOHN A. BORLAND.